2,950,965
RECOVERY OF PLATINUM FROM DEACTIVATED CATALYTIC COMPOSITES

James Hoekstra, Evergreen Park, and Edward Michalko, Chicago, Ill., assignors, by mesne assignments, to Universal Oil Products Company, Chicago, Ill., a corporation of Delaware No Drawing. Filed Feb. 11, 1957, Ser. No. 639,217

2 Claims. (Cl. 75—121)

The present invention relates to the recovery of noble metals from noble metal-containing composites and is specifically directed toward an improved method for recovering platinum from deactivated catalytic composites which contain platinum in combination with refractory inorganic oxides and other catalytic components, especially combined halogen.

Noble metal-containing catalysts are employed throughout commercial industries for promoting a multitude of reactions among which are cyclization, hydrogenation, dehydrogenation, isomerization, aromatization, sulphonation, dehydrocyclization, etc. After extensive periods of use, the catalytic composite usually becomes deactivated, and incapable of acceptable performance of its intended function. Catalyst deactivation may result from substances which are perculiar to the particular catalyst used, a change in the physical state of the catalytic components, a loss of said components, or from the deposition of impurities, in the form of solids, which shield the catalytically-active surfaces from the materials being processed. Generally, the deposition of coke or other carbonaceous material is a direct cause of catalyst deactivation, and very often occurs in combination with one of the previously mentioned causes of catalyst deactivation.

The coke and other carbonaceous material is frequently removed by burning the deactivated catalyst in a free oxygen-containing medium, such as air, which, to all appearances, has the effect of producing an active catalyst. Other, more recent, methods used in conjunction with air-oxidation of the deactivated catalyst, revert the catalytic components to their most active state, and produce caalysts which are nearly identical in composition and activity to the catalyst before used.

Each regeneration, however, yields a catalyst of somewhat lower activity than the catalyst prior to use, and which functions acceptably for a shorter period of time than the catalyst resulting from the preceding regeneration. Eventually it becomes necessary to replace the catalyst with a new, unused portion of catalyst, further regeneration being uneconomically justifiable. The high cost of the noble metal component does not permit discarding the deactivated catalytic composite per se, even though the concentration of the noble metal is relatively low when compared to the concentration of the other components. The present invention is directed to the recovery of noble metals from deactivated noble metal-containing catalytic composites which can no longer be regenerated economically.

As hereinbefore stated, metal-containing catalysts are extensively employed in commercial industries. Recent discoveries in the field of catalysis have made possible highly active catalysts which comprise minor quantities of noble and precious metals. Although small percentages, from about 0.01% to about 1% by weight of the noble metal, are employed, the high cost of such metals warrents their recovery and subsequent reuse in the manufacture of new, fresh catalysts. The method of the present invention is specifically directed to the recovery of platinum from deactivated platinum-containing catalytic composites, however, it is understood that the present invention may be advantageously employed to recover other noble metals such as iridium, osmium, palladium, rhodium, rhenium, reuthenium, and especially palladium.

The metals previously described are generally composited with an inert refractory inorganic oxide such as alumina, zirconia, silica, magnesia, thoria, etc. Mixtures of two or more of these refractory inorganic oxides may be employed, such as silica-alumina, silica-zirconia, silica-alumina-zirconia, etc. It is understood that these refractory inorganic oxides may be made in any suitable method including separate, successive or co-precipitation methods of manufacture.

Other catalytic components may be composited with the refractory inorganic oxide, in addition to the metals previously described. Other metals, such as iron, tungsten, sodium, nickel, cobalt, molybdenum, copper, chromium, mixtures of the same, etc., may be added to the catalytic composite. Halogen may also be composited with the refractory inorganic oxide, and is generally deposited therewith as the halide of one or more of the metals hereinbefore set forth. Similarly, sulfides, nitrates, oxides, and other metallic salts may be present.

One method in which the noble metal may be recovered is by treating the noble metal-containing composite with a suitable strong acid or alkali to dissolve the refractory inorganic oxide, and to free the noble metal in some finely divided or colloidal state. This method is satisfactory where the process in which the catalyst is ultimately employed does not require a substantially pure catalyst and the presence of impurities, therefore, is not exceedingly detrimental. On the other hand, it is an important requirement that certain noble metal-containing catalysts be substantially free from impurities, and in such cases it is necessary to further separate the precipitated noble metal from these impurities.

As hereinbefore stated, halogen is generally composited with the other components of the catalyst and is usually present in concentrations of from about 0.01% to about 8.0% by weight of the total catalyst. The halogen may be either fluorine, chlorine, bromine, iodine or, in some instances, a mixture of two or more may be employed; a particularly preferred mixture comprises fluorine and chlorine. The halogen is believed to exist in some particular combination with the other catalytic components, and is, therefore, referred to as combined halogen. Fluorine appears to be less easily removed from the catalyst during processing, and is preferred in many instances, either as the sole halogen or admixed with one or more of the previously mentioned halogens. The peculiar physical property of fluorine to remain on the catalyst and serve its intended function during processing presents particular problems when recovering the platinum and/or other noble metals from the deactivated catalyst.

The object of the present invention is to provide a method which eliminates from consideration the problems encountered through the continuing presence of fluoride ions while recovering noble metals from deactivated noble metal catalysts which contain combined fluorine.

A particular object of the present invention is to recover platinum from platinum-containing deactivated catalytic composites, which can no longer be regenerated economically, whereby the difficulties arising from the presence of fluoride ions in said composite are no longer encountered.

As hereinbefore set forth, the catalyst from which the platinum is to be recovered is generally reacted with a strong chemical reagent, either an inorganic acid or some strong alkaline substance. Prior to this particular treatment it is often desirable to remove as many of the various other contaminants which may exist in the catalytic composite, however, the treatments employed to remove these contaminants should neither enhance nor afford loss of platinum, and should not afford further contamination by depositing therewith other metallic components. Generally a deactivated catalytic composite is contaminated with metallic impurities, in addition to the refractory inorganic oxide, either as elements or simple salts, as well as carbon and other carbonaceous material. Such impurities may be partially removed by washing the metallic product with deionized water. The catalytic composite is then dried, and thereafter subjected to high-temperature oxidation in the presence of air, to remove the carbon and carbonaceous material.

The chemical reagent employed is generally one which will effect no reaction with the platinum, but will either dissolve or cause to form soluble salts, the refractory inorganic oxide material, the other catalytic components and any metallic impurities which may remain after previous treatments. The platinum remains thereby in some finely divided or colloidal state as a sludge containing minor amounts of metallic impurities and refractory inorganic oxide material, and significant quantities of combined fluoride. If the concentration of the chemical reagent, for example, an inorganic acid, is selected such that all of the refractory inorganic oxide and metallic components are dissolved, and substantially all of the remaining solid material comprises platinum, the resulting solution becomes highly acidic. The high degree of acidity of the solution presents difficulties in subsequent processing steps which are employed to revert the solution to a suitable source of the refractory inorganic oxide for reuse in the manufacture of new catalyst.

When the particular reagent is employed in such concentration that the resulting solution, containing dissolved refractory inorganic oxide material, is neither highly alkaline nor acidic, the platinum-containing sludge which remains may contain as much as 12% by weight of solid material other than platinum. The sludge will also contain an excess of combined fluoride which creates difficulties in subsequent steps in the recovery of the platinum.

After the initial treatment with either a strong acid or some other chemical reagent, the remaining platinum-containing sludge is generally subjected to the action of aqua regia to cause dissolution of the platinum. This particular procedure is effective and offers no problems in the absence of excessive quantities of combined fluoride and solids other than platinum. However, when these substances are present in significant amounts, the aqua regia will cause a substantial quantity of the solid impurities to dissolve, and will react with the combined fluoride to form hydrofluoric acid. The formation of hydrofluoric acid causes undue foaming of the mixture, and the corrosive properties of hydrofluoric acid present enumerable difficulties in subsequent processing and handling. The excess solids which are dissolved with the platinum create the necessity for additional processing steps prior to obtaining a substantially pure solution of chloroplatinic acid from which the platinum may be readily recovered in the pure metallic state.

In one embodiment, the present invention provides an improvement in the process for recovering noble metals from noble metal-containing catalytic composites wherein said composite is reacted with a strong chemical reagent thereby dissolving a substantial quantity of the refractory inorganic oxide and forming an insoluble noble metal-containing sludge, and wherein said sludge is further treated to recover said noble metal, which improvement comprises further reacting said sludge with sulfuric acid prior to recovering said noble metal therefrom.

In a specific embodiment, the present invention provides an improvement in the process for recovering platinum from a deactivated alumina-platinum-fluoride catalytic composite wherein said composite is reacted with a strong chemical reagent thereby dissolving a substantial quantity of the alumina and forming an insoluble fluoride-containing platinum sludge, and wherein said sludge is further treated to recover said platinum, which improvement comprises further reacting said fluoride-containing platinum sludge with an aqueous solution of from about 45% to about 75% by weight of sulfuric acid, maintaining the resulting mixture at a temperature of from about 85° C. to about 150° C. for a period of from about 1 to about 12 hours, separating the resulting fluoride-containing solution therefrom and further treating the remaining sludge to recover platinum therefrom.

Many methods are presently employed to recover noble metals from deactivated noble metal-containing catalytic composites. In the interest of simplicity, the following discussion will be limited to platinum, although it is understood that the method of the present invention is applicable to other metals, as hereinbefore set forth, and whatever process is utilized, it may be improved by the method of the present invention. A platinum-containing catalytic composite from which the coke and other carbonaceous material has been removed, is often subjected to a strong alkaline material such as sodium hydroxide or a strong inorganic acid such as nitric acid or sulfuric acid. Such procedures result in a platinum-containing sludge which contains, in addition to the platinum, unreacted refractory inorganic oxide material, various undissolved metallic contaminants and substantial quantities of combined fluoride. The usual procedure is to further treat this sludge with a material which will dissolve all of the platinum, thereby forming chloroplatinic acid, without dissolving substantial quantities of the refractory inorganic oxide and/or metallic contaminants. However, this procedure necessitates further treatments such as alternate precipitation and redissolution of the platinum, filtering, excessive washings, etc. in order to lower the concentration of said contaminants.

Whatever the process employed, it may be improved by the method of the present invention which comprises reacting the finely divided platinum-containing sludge with sulfuric acid prior to the treatment which results in the dissolution of the platinum contained therein. We have found that this treatment removes substantially all of the combined fluoride, and effects a large decrease in the quantity of solids, other than platinum, contained in the sludge. We have also found that the process wherein a platinum-containing sludge has been obtained by reacting the original deactivated composite with strong acids, including sulfuric acid, can be improved through the utlization of the present invention.

In accordance with the method of the present invention, a platinum-containing sludge, obtained through the utilization of any of the previously described methods, is treated with an aqueous solution of from about 15% to about 80% by weight of sulfuric acid for a period of from about 1 to about 24 hours. The resulting mixture is agitated by any suitable means, and heated to a temperature within the range of from about 50° C. to about 175° C. The reaction between the sulfuric acid and the impurities is not only facilitated by increased temperature, but is exothermic, and in many instances, it is preferred to maintain the temperature of the reaction mixture within the range of from about 85° C. to about 150° C.

The utilization of sulfuric acid of a concentration in excess of that which is theoretically required will insure the continuous presence of free acid in sufficient quantity to dissolve substantially all the impurities and remove substantially completely the combined fluoride. Aqueous solutions of from about 45% to about 75% by weight of sulfuric acid are preferred. As hereinbefore stated, the reaction is exothermic and, since the rate of reaction is facilitated by heat, the length of time of the reaction is generally reduced to about 1 to about 12 hours. Briefly, the preferred method of the present invention comprises reacting a fluoride-containing platinum sludge with an aqueous solution of from about 45 to about 75% by weight of sulfuric acid. The resulting mixture is continuously agitated, and when necessary, heated to and maintained at a temperature within the range of about 85° C. to about 150° C. for a period of from about 1 to about 12 hours.

The following examples will further illustrate the method of the present invention. It is not intended, however, to limit unduly the present invention to the concentrations and conditions therein employed.

The platinum-containing sludge employed in the examples was obtained from a commercially-deactivated catalytic composite which had been utilized in the reforming of hydrocarbons. The composites had previously been treated to remove any readily soluble metallic salts and coke and other carbonaceous material. The composites were then treated with sulfuric acid to dissolve a substantial amount of the refractory inorganic oxide contained therein.

EXAMPLE I 200 grams of a platinum-containing sludge which contained 4.17% by weight of solids other than platinum and which was contaminated with 35 p.p.m. of fluoride were weighed into an 800 milliliter beaker to which was added 145 milliliters of a solution of 96% by weight sulfuric acid. This quantity of sulfuric acid yields a concentration of 60% by weight sulfuric acid with the aqueous phase of the sludge. The resulting mixture was digested on a hot plate for a period of 4 hours at a temperature of 90–95° F. After digestion, 500 milliliters of water was added, and the solution allowed to cool and settle. The liquid phase was removed by decantation, and the remaining solids were washed four times with 200-milliliter portions of deionized water, each resulting liquid phase being removed by decantation. The digested and washed sludge was allowed to dry overnight at a temperature of 110° C., and the dried sludge was thereafter analyzed for fluoride concentration and percent solids other than platinum.

A second 200-gram portion of the platinum-containing sludge described above was digested in a 60% by weight sulfuric acid solution at a temperature of 135–140° C. for a period of four hours. The resulting liquid phase was removed by decantation and the solids thoroughly washed with deionized water as before. The digested and washed solids were dried overnight at a temperature of 110° C., and the dried solids subsequently analyzed for fluoride concentration and percent solids other than platinum.

The results of the analyses performed on the solids after treatment are shown in the following table (Table I), in which it is readily ascertained that the method of the present invention substantially lowers the concentration of solids other than platinum, and subsequently completely removes the combined fluoride.

Table I

| | Portion 1 | Portion 2 |
|---|---|---|
| Sulfuric Acid, wt. percent | 60 | 60 |
| Time of Digestion, hours | 4 | 4 |
| Digestion Temperature, ° C | 90–95 | 135–140 |
| Fluoride Concentration, p.p.m | 2.4 | 1 |
| Fluoride Removed, wt. percent | 93.2 | 97.0 |
| Solids After Treatment, wt. percent [1] | 2.29 | 0.83 |

[1] Solids other than platinum, based upon wet sludge.

EXAMPLE II 202 grams of a platinum containing sludge containing 11.9% by weight of solids other than platinum, and contaminated with 123 p.p.m. of fluoride, were weighed into a 800 milliliter beaker to which was added 19.5 milliliters of 96% by weight sulfuric acid. This quantity of sulfuric acid gave a concentration of 16.5% by weight sulfuric acid with the aqueous phase of the sludge. The resulting mixture was digested on a hot plate for a period of 4 hours at a temperature of 100–105° C. After digestion, the liquid phase was decanted and the remaining solids were washed with deionized water. The digested and washed solids were dried overnight and subsequently analyzed for fluoride concentration, and percent solids other than platinum.

A second portion of the platinum-containing sludge (123 p.p.m. fluoride) was digested utilizing a 60% by weight solution of sulfuric acid at a temperature of 135–140° C. As previously described, the resulting solids were washed, dried and subsequently analyzed for fluoride concentration and percent solids other than platinum.

The results of the analyses on the platinum-containing sludge contaminated with 123 p.p.m. fluoride are given in the following table (Table II).

Table II

| | Portion 1 | Portion 2 |
|---|---|---|
| Sulfuric Acid, wt. percent | 16.5 | 60 |
| Time of Digestion, hours | 4 | 4 |
| Digestion Temperature, ° C | 100–105 | 135–140 |
| Fluoride Concentration, p.p.m | 14.2 | 2.4 |
| Fluoride Removed, wt. percent | 88.5 | 98.0 |
| Solids after treatment, wt. percent [1] | 3.58 | 2.37 |

[1] Solids other than platinum, based upon wet sludge.

The foregoing examples illustrate the improvement and beneficial results which are afforded the process of recovering noble metals, especially platinum, through the utilization of the method of the present invention.

We claim as our invention:

1. A process for recovering platinum from a deactivated alumina-platinum-fluoride catalytic composite which comprises reacting said composite with sulfuric acid of sufficient strength to dissolve a substantial quantity of the alumina, digesting the remaining fluoride-containing platinum residue with an aqueous solution of from about 15% to about 80% by weight of sulfuric acid, maintaining the resulting mixture at a temperature of from about 50° C. to about 175° C. for a period of from about 1 to about 24 hours, separating the resulting fluoride-containing solution therefrom, and treating the remaining residue with aqua regia to recover platinum therefrom.

2. A process for recovering platinum from a deactivated alumina-platinum-fluoride catalytic composite which comprises reacting said composite with sulfuric acid of sufficient strength to dissolve a substantial quantity of the alumina, digesting the remaining fluoride-containing platinum residue with an aqueous solution of from about 45% to about 75% by weight of sulfuric acid, maintaining the resulting mixture at a temperature of from about 85° C. to about 150° C. for a period of from about 1 to about 12 hours, separating the resulting fluoride-containing solution therefrom, and treating the remaining residue with aqua regia to recover platinum therefrom.

References Cited in the file of this patent

UNITED STATES PATENTS

| | | |
|---|---|---|
| 981,451 | McKechnie et al. | Jan. 10, 1911 |
| 1,770,866 | Smith | July 15, 1930 |
| 2,710,799 | Leopard | June 14, 1955 |
| 2,787,540 | Appell | Apr. 2, 1957 |
| 2,805,941 | Tucker | Sept. 10, 1957 |
| 2,806,004 | Milliken | Sept. 10, 1957 |